No. 658,971. Patented Oct. 2, 1900.
J. H. WILT.
ADJUSTING DEVICE FOR PUMP RODS.
(Application filed Jan. 5, 1900.)
(No Model.)
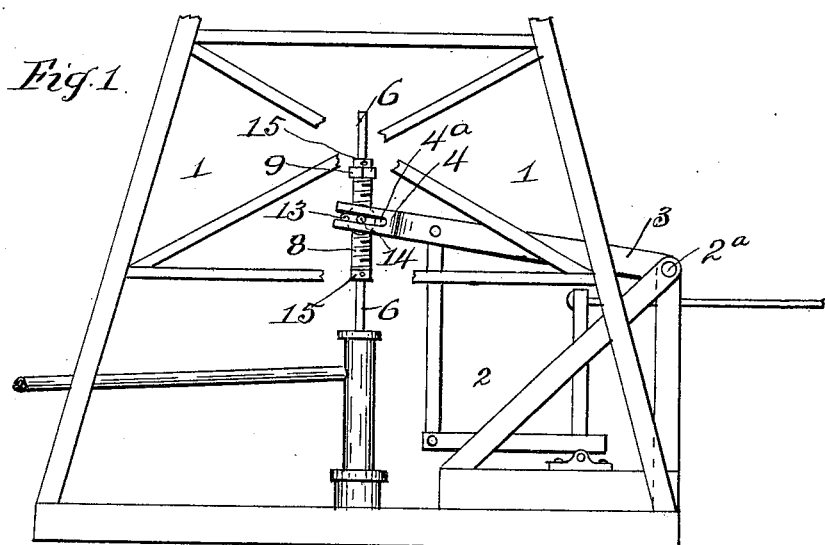
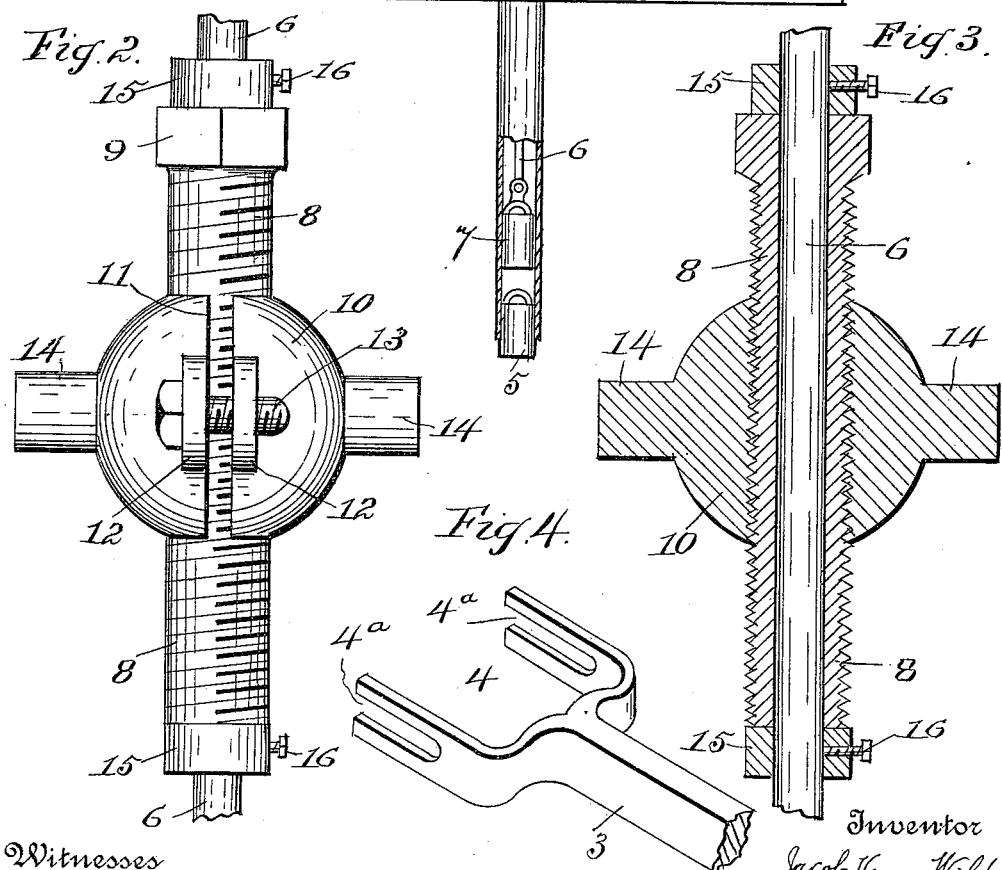
Witnesses
C. J. Belz
H. A. Smith
Inventor
Jacob Henry Wilt,
By W. H. Wills
Attorney

UNITED STATES PATENT OFFICE.

JACOB HENRY WILT, OF FRANKLIN, PENNSYLVANIA.

ADJUSTING DEVICE FOR PUMP-RODS.

SPECIFICATION forming part of Letters Patent No. 658,971, dated October 2, 1900.

Application filed January 5, 1900. Serial No. 505. (No model.)

*To all whom it may concern:*

Be it known that I, JACOB HENRY WILT, a citizen of the United States, residing at Franklin, in the county of Venango and State of Pennsylvania, have invented new and certain useful Improvements in Pumps, of which the following is a specification.

This invention relates to pumps, and particularly to a device for adjusting the stroke of the valve or sucker rod of pumps.

The object of the invention is to provide a novel and peculiar walking-beam for pumps, so that it will follow the pump-rod, by having its forked ends formed into U-shaped bearings for the trunnioned nut of the said rod.

The invention consists in the novel construction and arrangement of parts, as will be hereinafter more fully described, and set up in the appended claim.

In the accompanying drawings, forming part of this application, Figure 1 is an elevation of a pump, partly broken away, having my improved adjuster applied. Fig. 2 is a detail elevation of the sleeve and trunnion-nut applied to a sucker-rod. Fig. 3 is a vertical section of the sleeve and nut secured upon a sucker-rod. Fig. 4 is a perspective view of the forked rod, partly broken away.

The same numeral references denote the same parts throughout the several views of the drawings.

The derrick-like frame 1 carries the usual pumping-jack 2, having connected to it a pump-beam 3, pivoted at 2ª, which beam has a forked end 4, provided with U-shaped bearings 4ª. A valve 5 is located in the bottom of the well, as usual, and the sucker-rod 6 carries a valve 7. The means for adjusting the sucker-rod and varying the stroke thereof consists of a sleeve 8, having a smooth bore, an external screw-thread, and an integral nut 9 at one end, a split nut 10 or a nut having a slot 11, ears 12 for a suitable bolt 13, by means of which the nut is secured upon the sleeve 8, and trunnions 14 at right angles to the nut-hole and the slot. The sleeve 8 is secured on the sucker-rod as desired by collars 15, having set-screws 16. The nut 10 is of spherical shape, so that the U-shaped bearings will have no friction on the nut. The sleeve being secured to the sucker-rod, as above stated, the trunnions 14 are fitted in the U-shaped bearings 4ª, and the beam 3 will carry the said rod with every movement given the beam by the pumping-jack. It will therefore be seen that by simply loosening the bolt 13 and turning the sleeve 8 the nut 10 will be moved up or down in accordance with the movement of the sleeve, carrying with it the forked end of the beam. By adjusting the collars the position of the sleeve 8 is changed on the pumping-rod to have the valves bump or engage each other with sufficient force to dislodge any foreign matter contained therein without necessarily stopping the pump, and after one or more strokes of the rod the nut is readjusted as desired for proper pumping without stopping the pump.

I am aware that trunnioned nuts adjustably secured to a sleeve through which works the pump-rod, with a walking-beam connected to the said nut, is not new, and I therefore lay no claim to such nor to the particular nut herein shown and described.

Having thus described my invention, what I claim as new, and desire to secure by Letters Patent, is—

In a pump, the combination, with the spherical nut vertically adjustable on the pump-rod, and having trunnions, of a walking-beam pivoted at one end to a fixed member of the pump-frame, the other end being forked so as to extend around the nut, each member of the forked end having a U-shaped bearing for the said trunnions, whereby the said beam may be operated without engaging the nut, substantially as set forth.

In witness whereof I hereunto set my hand in the presence of two witnesses.

JACOB HENRY WILT.

Witnesses:
FRANCIS A. SAYERS,
HARRY HOUSE.